(12) United States Patent
Zhou et al.

(10) Patent No.: US 8,986,573 B2
(45) Date of Patent: Mar. 24, 2015

(54) TERBIUM DOPED PHOSPHATE-BASED GREEN LUMINESCENT MATERIAL AND PREPARATION METHOD THEREOF

(75) Inventors: Mingjie Zhou, Shenzhen (CN); Jun Liu, Shenzhen (CN); Xiaofang Liang, Shenzhen (CN); Shiliang Liu, Shenzhen (CN); Qiurong Liao, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 391 days.

(21) Appl. No.: 13/574,528

(22) PCT Filed: Feb. 4, 2010

(86) PCT No.: PCT/CN2010/070511
§ 371 (c)(1),
(2), (4) Date: Jul. 20, 2012

(87) PCT Pub. No.: WO2011/094937
PCT Pub. Date: Aug. 11, 2011

(65) Prior Publication Data
US 2012/0292570 A1    Nov. 22, 2012

(51) Int. Cl.
*C09K 11/71*    (2006.01)
*C01F 17/00*    (2006.01)
(Continued)

(52) U.S. Cl.
CPC ............... *C01F 7/168* (2013.01); *C01B 25/45* (2013.01); *C01F 7/16* (2013.01); *C09K 11/7778* (2013.01)
USPC .................................................. 252/301.4 P

(58) Field of Classification Search
USPC .............................. 252/301.4 P; 423/263, 306
See application file for complete search history.

(56) References Cited

U.S. PATENT DOCUMENTS 4,037,110 A * 7/1977 Shaffer et al. .............. 250/483.1
4,151,443 A    4/1979 Van Den Boom et al.

FOREIGN PATENT DOCUMENTS

CN    1180095 A    4/1998
CN    101016453 A    8/2007
(Continued)

OTHER PUBLICATIONS

Liang et al, "Photoluminescence of Ce3+, Pr3+ and Tb3+ activated Sr3Ln(PO4)3 under VUV-UV exciatation", Journal of Solid State Chemistry, 177, issue 3, Mar. 2004, pp. 901-098.*

(Continued)

*Primary Examiner* — Carol M Koslow
(74) *Attorney, Agent, or Firm* — Shimokaji IP

(57) ABSTRACT

Terbium doped phosphate-based green luminescent material and preparation method thereof are provided. The chemical formula of the material is $M_3RE_{1-x}Tb_x(PO_4)_3$, wherein, M is alkaline-earth metals, RE is rare-earth elements, x is in a range of 0.001 to 1. The preparation method of the material includes the following steps; providing the compound used as the source of alkaline earth metal, the compound used as the source of phosphate, the compound used as the source of rare-earth, and the compound used as the source of $Tb^{3+}$ according to the molar ratio of the elements in $M_3RE_{1-x}Tb_x(PO_4)_3$, wherein, the compound used as the source of phosphate is added at excess molar ratio in a range of 10% to 30%; mixing and grinding the compound to get mixture; sintering the mixture as pre-treatment, and then cooling the mixture to get a sintered matter; grinding; calcining in reducing atmosphere, and then cooling them.

7 Claims, 3 Drawing Sheets

(51) Int. Cl.
  *C01F 7/16* (2006.01)
  *C01B 25/45* (2006.01)
  *C09K 11/77* (2006.01)

(56) References Cited

FOREIGN PATENT DOCUMENTS

| DE | 2534834 A1 | 2/1976 |
|---|---|---|
| GB | 2124243 A | 2/1984 |
| JP | 5457480 A | 5/1979 |
| JP | 2009087627 A | 4/2009 |

OTHER PUBLICATIONS

Liang et al, "THe luminescent propeties of Ba3Gd1-xLnx(PO4)3 under synchrotron radiation VUV exciatation", Materials Science and Engineering B 119, issue 2, May 25, 2005, pp. 152-158.*

Xu et al, "Hybrid precursors synthesis and photoluminescence of rare earh ions-activated Sr3Y(PO4)3 phosphors", Journal of Optoelectronic and Advanced Materials, vol. 10, No. 10, Oct. 2008, pp. 2727-2731.*

Photoluminescence of Ce3+, Pr3+, and Tb3+ activated Sr3Ln(PO4)3 under VUV-UV excitation, Hongbin Liang et al., Journal of Solid State Chemistry, 177 (2004) 901-908.

Hybrid precursors synthesis and photoluminescence of rare earth ions-activated Sr3 Y (PO4)3 phosphors, Shuai Xu et al., Journal of Optoelectronics and Advanced Materials, vol. 10, No. 10, Oct. 2008, pp. 2727-2731.

New Compounds with Eulytine structure: Crystal Chemistry and Luminescence, G. Blasse, Journal of Solid State Chemistry 2 , pp. 27-30 (1970).

Ca3Ln(P04)3 (Ln=La—Gd) Phase with the Eulytite structure, McCarthy, G.J. et al., Journal of Solid State Chemistry 38, pp. 128-129 (1981).

Liang et al, "The luminescent properties of Ba3Gd1-xLnx(PO4)3 under synchrotron radiation VUV excitation", Materials Science and Engineering B, vol. 119(2005) , pp. 152-158.

Xiao et al, "Photoluminescent properties of Eu 3+, Tb 3+activated M3Ln(P04)3 (M=Sr, Ca; Ln=Y, La, Gd) phosphors derived from hybrid precursors", Journal of Alloys and Compounds, Elsevier Sequoia, Lausanne, CH,vol. 429, No. 1-2, (Feb. 3, 2007), pp. 255-259.

Yingchao Han et al, "Synthesis of terbium doped calcium phosphate nanocrystalline powders by citric acid sola gel combustion method", Journal of Sol-Gel Science and Technology, Kluwer Academic Publishers, BO,vol. 49, No. 1,(2009), pp. 125-129.

De Jager-Veenis A W et al, "Vacuum Ultraviolet Excitation Spectra of Phosphors for Use in Gas Discharge Display Panels", Journal'of the Electrochemical,vol. 123, No. 8,(Aug. 1, 1976), pp. 1253-1254.

Huang et al, "Thermally stable green Ba3Y (P04)3: Ce3,Tb3 and red Ca3Y (AIO) 3 (B03) 4: Eu3 phosphors for white-light fluorescent lamps", Optics Express,vol. 19, No. S 1, (Jan. 3, 2011), p. A1-A6.

* cited by examiner

TERBIUM DOPED PHOSPHATE-BASED GREEN LUMINESCENT MATERIAL AND PREPARATION METHOD THEREOF

FIELD OF THE INVENTION

The present disclosure relates to luminescent materials, especially to a terbium doped phosphate-based green luminescent material which can be excited by vacuum ultraviolet light and a preparation method thereof.

BACKGROUND OF THE INVENTION

Recently, With increasing emphasis on environmental protection, mercury-free light source has become one of important direction of the study. Xenon (Xe) discharging is now the main excited light. Xe radiation may produce a light having a wavelength of 147 nm or 172 nm which can excite luminescent material. To improve energy utilization of the Xe radiation, a suitable luminescent material is necessary to be developed. The suitable luminescent material can effectively absorb the 172 nm light and convert the 172 nm light to a visible light. Now the main commercial luminescent materials are $Y_2O_3:Eu^{3+}$, $(Y, Gd)BO_3:Eu^{3+}$ (both of them are red luminescent materials), $Zn_2SiO_4:Mn^{2+}$, $BaAl_{12}O_{19}:Mn^{2+}$ (both of them are green luminescent materials), and $BaMgAl_{10}O_{17}:Eu^{2+}$ (blue luminescent materials). However, the green luminescent materials, the $Zn_2SiO_4:Mn^{2+}$ and the $BaAl_{12}O_{19}:Mn^{2+}$ both have long afterglow time, which negatively affect the display of dynamic images.

Basically in luminescence mechanism, the luminescent materials emits visible light by absorbing vacuum ultraviolet light (VUV) and then transiting the energy to luminescent ions of the luminescent material which emits light. Accordingly, the luminescent material may have a more effective emitting by improving the absorption of VUV and the energy transition of the material. That is, the sensitized groups contained in the material, such as negative ion groups, can be utilized to sensitize luminescent ions to improve the emitting property. In the negative ion groups, an isolated $PO_4^{3-}$ group, has a space P—O tetrahedral structure and a strong absorption to the 150 nm-175 nm light. The phosphates, such as $Sr_3Y(PO_4)_3$, $Ca_3Y(PO_4)_3$, $Ba_3La(PO_4)_3$, $Ca_3La(PO_4)_3$, $Sr_3La(PO_4)_3$, and $Ca_3Gd(PO_4)_3$, all contain isolated space P—O tetrahedral structures. These phosphates have excellent stabilities and vacuum ultraviolet radiation resistance. The green luminescent materials having luminescence centers of terbium ions ($Tb^{3+}$) have been widely used. These $Tb^{3+}$ contained green luminescent materials, such as $Ca_5(PO_4)_3F:Tb^{3+}$, $Na_2GdPO_4F_2:Tb^{3+}$, $NaGd(PO_3)_4:Tb^{3+}$, and $La(PO_3)_3:Tb^{3+}$, have high luminescence intensity and short fluorescence life time.

However, there are none of disclosure of the luminescent materials, such as, $Sr_3Y(PO_3)_3$, $Ca_3Y(PO_4)_3$, $Ba_3La(PO_4)_3$, $Ca_3La(PO_4)_3$, $Sr_3La(PO_4)_3$, and $Ca_3Gd(PO_4)_3:Tb^{3+}$, all of which can be excited by VUV.

SUMMARY OF THE INVENTION

The technical problem of the present invention to be solved is to provide terbium doped phosphate-based green luminescent material which has high luminescence intensity, and preparation method for the material. The method is simple, environmental friendly, easy to be controlled, and can be effectively implemented in industry.

The technical solution to solve the technical problem in the present invention is: providing terbium doped phosphate-based green luminescent material, the said terbium doped phosphate-based green luminescent material has chemical formula of $M_3RE_{1-x}Tb_x(PO_4)_3$, wherein, M is alkaline-earth metal, RE is rare-earth element, and x is in a range of 0.001 to 1.

And, preparation method of terbium doped phosphate-based green luminescent material, comprises:

Step one, providing the compound used as the source of alkaline earth metal, the compound used as the source of phosphate, the compound used as the source of rare-earth, and the compound used as the source of $Tb^{3+}$ according to the molar ration of the elements in $M_3RE_{1-x}Tb_x(PO_4)_3$, wherein the compound used as the source of phosphate is added at excess molar ratio in a range of 10% to 30%, M is alkaline earth metal, RE is rare-earth element, and x is in a range of 0.001 to 1;

Step two, mixing and grinding the compounds to get a mixture;

Step three, sintering the mixture as pre-treatment, and then cooling the mixture to get a sintered matter;

Step four, grinding the sintered matter, calcining the ground matter in reducing atmosphere and then cooling them to get the terbium doped phosphate-based green luminescent material.

In the exemplary embodiment, the terbium doped phosphate-based green luminescent material formed by the sintering process and the calcining process has a strong absorption of the 172 nm light. The exemplary material can be used as a green luminescent material in PDP or mercury-free fluorescent lamps.

Compared to the present technology, the invention has the advantages of: 1. the terbium doped phosphate-based green luminescent material not only has a strong absorption of the 172 nm light, the terbium doped phosphate-based green luminescent material of the exemplary embodiment further has a short fluorescence life time. When the terbium doped phosphate-based green luminescent material is $Ca_3La_{0.95}Tb_{0.05}(PO_4)_3$ the fluorescence life time is about 2.46 ms, which is lower than the commercial $BaAl_{12}O_{19}:Mn$. 2. The terbium doped phosphate-based green luminescent material of the exemplary embodiment has a higher luminescence intensity than that of the commercial $BaAl_{12}O_{19}:Mn$. 3. The preparation method of terbium doped phosphate-based green luminescent material is simply, environmental friendly, easy controlled, and can be commercially processed.

BRIEF DESCRIPTION OF THE DRAWINGS

Further description of the present invention will be illustrated, which combined with drawings and embodiments in the drawings.

DETAILED DESCRIPTION OF ILLUSTRATED EMBODIMENTS

The examples hereinafter described merely being preferred or exemplary embodiment of the disclosure. It will be apparent that various changes may be made thereto without departing from the spirit and scope of the disclosure.

According to an embodiment, a terbium doped phosphate-based green luminescent material has chemical formula of $M_3RE_{1-x}Tb_x(PO_4)_3$, wherein, M is alkaline earth metal, RE is rare-earth element, and x is in a range of 0.001 to 1. The rare-earth element RE is at least one of the gadolinium (Gd), yttrium (Y), and lanthanum (La). The alkaline earth metal M is at least one of the calcium (Ca), strontium (Sr), and barium (Ba).

In the terbium doped phosphate-based green luminescent material, $M_3RE(PO_4)_3$ is the matrix of the terbium doped phosphate-based green luminescent material, as a metaphosphate, the $M_3RE(PO_4)_3$ has a strong vacuum ultraviolet radiation resistance. When $Tb^{3+}$ is doped to the $M_3RE(PO_4)_3$, the luminescence mechanism of the $M_3RE(PO_4)_3$ is: one aspect, the $Tb^{3+}$ in the material has a f-d transition at a wavelength in a range of 170 nm to 220 nm, between which the material absorbs the 172 nm light, on the other hand, the matrix of the material has a strong absorption of the 150 nm-175 nm vacuum ultraviolet light (VUV), for the f-d transition of the $Tb^{3+}$ is just posited between the 150 nm-175 nm wavelengths, thus the energy absorbed by the matrix can be effectively transited to the $Tb^{3+}$ to emit green light. As such, the utilization of the VUV of the material is improved and the luminescence intensity of the $Tb^{3+}$ is enhanced.

Figure 4:
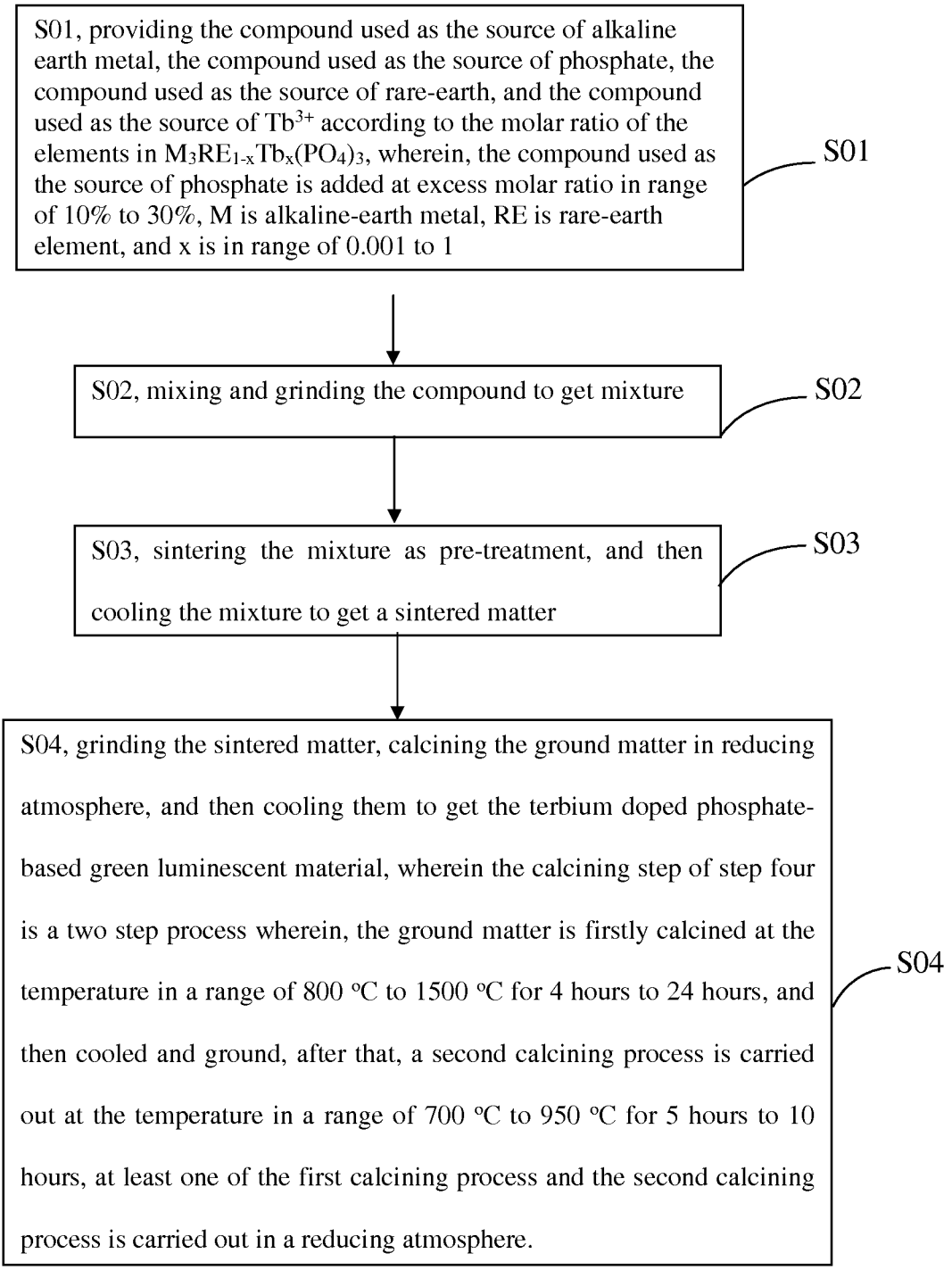
FIG. 4 shows a flow chat of preparation method of the terbium doped phosphate-based green luminescent material.

Referring to FIG. 4, a preparation method of the terbium doped phosphate-based green luminescent material includes the following steps;

S01, the compound used as the source of alkaline earth metal, the compound used as the source of phosphate, the compound used as the source of rare-earth, and the compound used as the source of $Tb^{3+}$ according to the molar ratio of the elements in $M_3RE_{1-x}Tb_x(PO_4)_3$ are provided. The compound used as the source of phosphate is added at excess molar ratio in a range of 10%-30%. M is alkaline earth metal, RE is rare-earth element, and x is in a range of 0.001 to 1;

S02, the compounds are mixed and ground in an agate mortar to get a mixture;

S03, the mixture is sintered as pre-treatment, and then cooled to get a sintered matter;

S04, the sintered matter is removed out and ground. The ground matter is then calcined in reducing atmosphere and then cooled to get the terbium doped phosphate-based green luminescent material.

In step S01, the compound used as the source of alkaline earth metal is at least one of alkaline earth oxide, alkaline earth hydroxide, alkaline earth carbonate, and alkaline earth oxalate. The compound used as the source of phosphate is at least one of diammonium phosphate and ammonium dihydrogen phosphate. The compound used as the source of $RE^{3+}$ is rare-earth oxide, rare-earth nitrate, or rare-earth oxalate. All of the compounds are provided according to the molar ratio of the elements in the $M_3RE_{1-x}Tb_x(PO_4)_3$. The compound used as the source of phosphate is added at excess molar ratio in a range of 10% to 30%, optimal selection of 20% in the embodiment.

In step S03, the mixture is sintered in a corundum crucible (not shown) at the temperature in a range of 300° C. to 700° C. for 1 hour to 6 hours. The sintered matter is then cooled to room temperature.

In step S04, the sintered matter is ground and then calcined in a reducing atmosphere to get the terbium doped phosphate-based green luminescent material. Specially, the calcining process includes a first calcining process and a second calcining process. The first calcining process is carried out in an oven (not shown) at the temperature in a range of 800° C. to 1500° C. for 4 hours to 24 hours. The first calcining process is followed by a cooling process and a grinding process. The second calcining process is carried out in the oven at the temperature in a range of 700° C. to 950° C. for 5 hours to 10 hours. At least one of the first and the second calcining processes is carried out in a reducing atmosphere. The reducing atmosphere is the mixing gases of nitrogen and hydrogen, hydrogen, or carbon monoxide.

Special examples are disclosed as follows to demonstrate the terbium doped phosphate-base green luminescent material and preparation method for making the same. In the examples, the rare-earth oxide, the rare-earth nitrate, and the rare-earth oxalate all have a purity of more than 4N. The diammonium phosphate and the ammonium dihydrogen phosphate are both chemically pure. The reducing atmosphere is the mixing gases of the nitrogen and the hydrogen having a volume ratio of 95:5 or 90:10, the hydrogen, or the carbon monoxide.

Example 1

0.9008 g calcium carbonate ($CaCO_3$), 1.2422 g ammonium dihydrogen phosphate ($NH_4H_2PO_4$) (at excess molar ratio of 20%), 0.0279 g terbium oxide ($Tb_4O_7$), and 0.4645 g lanthanum oxide ($La_2O_3$) are provided and positioned in an agate mortar to be ground. The ground matter is sintered in a corundum crucible at 500° C. for 3 hours and then naturally cooled to room temperature. The cooled sintered matter is ground completely. After that, the sintered matter is firstly calcined at 1300° C. for 10 hours in a reducing atmosphere and then cooled to room temperature. The reducing atmosphere is a mixing gas of $N_2$ and $H_2$ having a volume ratio of 95:5. The first calcined matter is ground once more and secondly calcined at 900° C. for 5 hours, followed by a cooling process and a grinding process. As such, white powders of terbium doped phosphate-based green luminescent material of $Ca_3La_{0.95}Tb_{0.05}(PO_4)_3$ are obtained.

Example 2

1.3287 g strontium carbonate ($SrCO_3$), 1.2423 g ammonium dihydrogen phosphate ($NH_4H_2PO_4$) (at excess molar ratio of 20%), 0.0281 g terbium oxide ($Tb_4O_7$), and 0.4643 g lanthanum oxide ($La_2O_3$) are provided and positioned in an agate mortar to be ground. The ground matter is sintered in a corundum crucible at 300° C. for 6 hours and then naturally cooled to room temperature. The cooled sintered matter is ground completely. After that, the sintered matter is firstly calcined at 1250° C. for 8 hours in a reducing atmosphere and then cooled to room temperature. The reducing atmosphere is a mixing gas of $N_2$ and $H_2$ having a volume ratio of 95:5. The first calcined matter is ground once more and then secondly calcined at 900° C. for 7 hours, followed by a cooling process and a grinding process. As such, white powders of terbium doped phosphate-based green luminescent material of $Sr_3La_{0.95}Tb_{0.05}(PO_4)_3$ are obtained.

Example 3

1.7786 g barium carbonate ($BaCO_3$), 1.2422 g ammonium dihydrogen phosphate ($NH_4H_2PO_4$) (at excess molar ratio of 20%), 0.0280 g terbium oxide ($Tb_4O_7$), and 0.4645 g lanthanum oxide ($La_2O_3$) are provided and positioned in an agate mortar to be ground. The ground matter is sintered in a corundum crucible at 700° C. for 1 hour and then naturally cooled to room temperature. The cooled sintered matter is ground completely. After that, the sintered matter is firstly calcined at 950° C. for 8 hours in a reducing atmosphere and then cooled to room temperature. The reducing atmosphere is a mixing gas of $N_2$ and $H_2$ having a volume ratio of 95:5. The first calcined matter is ground once more and then secondly calcined at 900° C. for 6 hours, followed by a cooling process and a grinding process. As such, white powders of terbium doped phosphate-based green luminescent material of $Ba_3La_{0.95}Tb_{0.05}(PO_4)_3$ are obtained.

Example 4

1.3287 g strontium carbonate ($SrCO_3$), 1.2423 g ammonium dihydrogen phosphate ($NH_4H_2PO_4$) (at excess molar ratio of 20%), 0.0561 g terbium oxide ($Tb_4O_7$), and 0.4398 g lanthanum oxide ($La_2O_3$) are provided and positioned in an agate mortar to be ground. The ground matter is sintered in a corundum crucible at 300° C. for 4 hours and then naturally cooled to room temperature. The cooled sintered matter is ground completely. After that, the sintered matter is firstly calcined at 800° C. for 12 hours in a reducing atmosphere and then cooled to room temperature. The reducing atmosphere is a mixing gas of $N_2$ and $H_2$ having a volume ratio of 95:5. The first calcined matter is ground once more and secondly calcined at 800° C. for 7 hours at a reducing atmosphere of $H_2$, followed by a cooling process and a grinding process. As such, white powders of terbium doped phosphate-based green luminescent material of $Sr_3La_{0.90}Tb_{0.10}(PO_4)_3$ are obtained.

Example 5

1.7786 g barium carbonate ($BaCO_3$), 1.2423 g ammonium dihydrogen phosphate ($NH_4H_2PO_4$) (at excess molar ratio of 20%), and 0.5606 g terbium oxide ($Tb_4O_7$) are provided and positioned in an agate mortar to be ground. The ground matter is sintered in a corundum crucible at 600° C. for 4 hours and then naturally cooled to room temperature. The cooled sintered matter is ground completely. After that, the sintered matter is firstly calcined at 950° C. for 8 hours and then cooled to room temperature. The first calcined matter is ground once more and secondly calcined at 900° C. for 6 hours in a reducing atmosphere of $H_2$, followed by a cooling process and a grinding process. As such, white powders of terbium doped phosphate-based green luminescent material of $Ba_3Tb(PO_4)_3$ are obtained.

Example 6

0.5046 g calcium oxide (CaO), 1.2423 g ammonium dihydrogen phosphate ($NH_4H_2PO_4$) (at excess molar ratio of 20%), and 0.5606 g terbium oxide ($Tb_4O_7$) are provided and positioned in an agate mortar to be ground. The ground matter is sintered in a corundum crucible at 500° C. for 3 hours and then naturally cooled to room temperature. The cooled sintered matter is ground completely. After that, the sintered matter is firstly calcined at 1200° C. for 10 hours in a reducing atmosphere of CO and then cooled to room temperature. The first calcined matter is ground once more and secondly calcined at 900° C. for 5 hours, followed by a cooling process and a grinding process. As such, white powders of terbium doped phosphate-based green luminescent material of $Ca_3Tb(PO_4)_3$ are obtained.

Example 7

1.3287 g strontium carbonate ($SrCO_3$), 1.2423 g ammonium dihydrogen phosphate ($NH_4H_2PO_4$) (at excess molar ratio of 20%), 0.0841 g terbium oxide ($Tb_4O_7$), and 0.4155 g lanthanum oxide ($La_2O_3$) are provided and positioned in an agate mortar to be ground. The ground matter is sintered in a corundum crucible at 500° C. for 4 hours and then naturally cooled to room temperature. The cooled sintered matter is ground completely. After that, the sintered matter is firstly calcined at 1200° C. for 8 hours in a reducing atmosphere of $H_2$ and then cooled to room temperature. The first calcined matter is ground once more and secondly calcined at 900° C. for 7 hours, followed by a cooling process and a grinding process. As such, white powders of terbium doped phosphate-based green luminescent material of $Sr_3La_{0.85}Tb_{0.15}(PO_4)_3$ are obtained.

Example 8

1.3287 g strontium carbonate ($SrCO_3$), 1.2423 g ammonium dihydrogen phosphate ($NH_4H_2PO_4$) (at excess molar ratio of 20%), 0.0841 g terbium oxide ($Tb_4O_7$), and 0.2880 g yttrium oxide ($Y_2O_3$) are provided and positioned in an agate mortar to be ground. The ground matter is sintered in a corundum crucible at 500° C. for 4 hours and then naturally cooled to room temperature. The cooled sintered matter is ground completely. After that, the sintered matter is firstly calcined at 1100° C. for 8 hours in a reducing atmosphere of CO and then cooled to room temperature. The first calcined matter is ground once more and secondly calcined at 900° C. for 7 hours, followed by a cooling process and a grinding process. As such, white powders of terbium doped phosphate-based green luminescent material of $Sr_3Y_{0.85}Tb_{0.15}(PO_4)_3$ are obtained.

Example 9

0.9008 g calcium carbonate ($CaCO_3$), 1.2423 g ammonium dihydrogen phosphate ($NH_4H_2PO_4$) (at excess molar ratio of 20%), 0.0841 g terbium oxide ($Tb_4O_7$), and 1.1507 g six gadolinium nitrate hydrate ($Gd(NO_3)_3 \cdot 6H_2O$) are provided and positioned in an agate mortar to be ground. The ground matter is sintered in a corundum crucible at 500° C. for 4 hours and then naturally cooled to room temperature. The cooled sintered matter is ground completely. After that, the sintered matter is firstly calcined at 1000° C. for 8 hours in a reducing atmosphere of CO and then cooled to room temperature. The first calcined matter is ground once more and secondly calcined at 900° C. for 7 hours in a reducing atmosphere of $N_2$ and $H_2$, followed by a cooling process and a grinding process. The volume ratio of the $N_2$ and the $H_2$ is 90:10. As such, white powders of terbium doped phosphate-based green luminescent material of $Ca_3Gd_{0.85}Tb_{0.15}(PO_4)_3$ are obtained.

Example 10

0.6668 g calcium hydroxide ($Ca(OH)_2$), 1.3458 g ammonium dihydrogen phosphate ($NH_4H_2PO_4$) (at excess molar ratio of 30%), 0.0841 g terbium oxide ($Tb_4O_7$), and 0.2880 g yttrium ($Y_2O_3$) are provided and positioned in an agate mortar to be ground. The ground matter is sintered in a corundum crucible at 500° C. for 4 hours and then naturally cooled to room temperature. The cooled sintered matter is ground completely. After that, the sintered matter is firstly calcined at 1000° C. for 8 hours in a reducing atmosphere of $H_2$ and then cooled to room temperature. The first calcined matter is ground once more and secondly calcined at 900° C. for 7 hours, followed by a cooling process and a grinding process.

As such, white powders of terbium doped phosphate-based green luminescent material of $Ca_3Y_{0.85}Tb_{0.15}(PO_4)_3$ are obtained.

Example 11

1.1529 g calcium oxalate ($CaC_2O_4$), 1.3074 g diammonium phosphate ($(NH_4)_2HPO_4$) (at excess molar ratio of 10%), 0.0436 g terbium oxalate ($Tb_2(C_2O_4)_3$), and 0.4643 g lanthanum oxide ($La_2O_3$) are provided and positioned in an agate mortar to be ground. The ground matter is sintered in a corundum crucible at 500° C. for 3 hours and then naturally cooled to room temperature. The cooled sintered matter is ground completely. After that, the sintered matter is firstly calcined at 1300° C. for 10 hours in a reducing atmosphere of $N_2$ and $H_2$ and then cooled to room temperature. The volume ratio of the $N_2$ and $H_2$ is 95:5. The first calcined matter is ground once more and secondly calcined at 700° C. for 10 hours, followed by a cooling process and a grinding process. As such, white powders of terbium doped phosphate-based green luminescent material of $Ca_3La_{0.95}Tb_{0.05}(PO_4)_3$ are obtained.

Example 12

1.7428 g strontium oxalate monohydrate ($SrC_2O_4 \cdot H_2O$), 1.2423 g diammonium phosphate ($(NH_4)_2HPO_4$) (at excess molar ratio of 20%), 0.0841 g terbium oxide ($Tb_4O_7$), and 0.9672 g ten gadolinium oxalate hydrate ($Gd_2(C_2O_4)_3 \cdot 10H_2O$) are provided and positioned in an agate mortar to be ground. The ground matter is sintered in a corundum crucible at 500° C. for 4 hours and then naturally cooled to room temperature. The cooled sintered matter is ground completely. After that, the sintered matter is firstly calcined at 800° C. for 24 hours in a reducing atmosphere of CO and then cooled to room temperature. The first calcined matter is ground once more and secondly calcined at 900° C. for 7 hours in a reducing atmosphere of $N_2$ and $H_2$, followed by a cooling process and a grinding process. The volume ratio of the $N_2$ and $H_2$ is 90:10. As such, white powders of terbium doped phosphate-based green luminescent material of $Sr_3Gd_{0.85}Tb_{0.15}(PO_4)_3$ are obtained.

Example 13

1.3287 g strontium carbonate ($SrCO_3$), 1.4262 g diammonium phosphate ($(NH_4)_2HPO_4$) (at excess molar ratio of 20%), 0.0014 g six terbium nitrate hydrate ($Tb(NO_3)_3 \cdot 6H_2O$), and 0.4882 g lanthanum oxide ($La_2O_3$) are provided and positioned in an agate mortar to be ground. The ground matter is sintered in a corundum crucible at 500° C. for 4 hours and then naturally cooled to room temperature. The cooled sintered matter is ground completely. After that, the sintered matter is firstly calcined at 1500° C. for 4 hours in a reducing atmosphere of $N_2$ and $H_2$ and then cooled to room temperature. The volume ratio of the $N_2$ and $H_2$ is 95:5. The first calcined matter is ground once more and secondly calcined at 950° C. for 5 hours, followed by a cooling process and a grinding process. As such, white powders of terbium doped phosphate-based green luminescent material of $Sr_3La_{0.999}Tb_{0.001}(PO_4)_3$ are obtained.

Example 14

0.4504 g calcium carbonate ($CaCO_3$), 0.3321 g strontium carbonate ($SrCO_3$), 0.4440 g barium carbonate ($BaCO_3$), 1.2422 g ammonium dihydrogen phosphate $NH_4H_2PO_4$ (at excess molar ratio of 20%), 0.0279 g terbium oxide ($Tb_4O_7$), 0.0517 g gadolinium oxide ($Gd_2O_3$), and 0.4179 g lanthanum oxide ($La_2O_3$) are provided and positioned in an agate mortar to be ground. The ground matter is sintered in a corundum crucible at 500° C. for 3 hours and then naturally cooled to room temperature. The cooled sintered matter is ground completely. After that, the sintered matter is firstly calcined at 1300° C. for 10 hours in a reducing atmosphere of $N_2$ and $H_2$ and then cooled to room temperature. The volume ratio of the $N_2$ and $H_2$ is 90:10. The first calcined matter is ground once more and secondly calcined at 900° C. for 5 hours, followed by a cooling process and a grinding process. As such, white powders of terbium doped phosphate-based green luminescent material of $(Ca_{0.50}Sr_{0.25}Ba_{0.25})_3(La_{0.90}Gd_{0.10})_{0.95}Tb_{0.05}(PO_4)_3$ are obtained.

Example 15

0.8558 g calcium carbonate ($CaCO_3$), 0.0888 g barium carbonate ($BaCO_3$), 1.2422 g ammonium dihydrogen phosphate $NH_4H_2PO_4$ (at excess molar ratio of 20%), 0.0279 g terbium oxide ($Tb_4O_7$), 0.1609 g yttrium oxide ($Y2O3$), 0.0517 g gadolinium oxide ($Gd_2O_3$), and 0.1857 g lanthanum oxide ($La_2O_3$) are provided and positioned in an agate mortar to be ground. The ground matter is sintered in a corundum crucible at 500° C. for 3 hours and then naturally cooled to room temperature. The cooled sintered matter is ground completely. After that, the sintered matter is firstly calcined at 1200° C. for 10 hours in a reducing atmosphere of $N_2$ and $H_2$ and then cooled to room temperature. The volume ratio of the $N_2$ and $H_2$ is 90:10. The first calcined matter is ground once more and secondly calcined at 900° C. for 5 hours, followed by a cooling process and a grinding process. As such, white powders of terbium doped phosphate-based green luminescent material of $(Ca_{0.95}Ba_{0.05})_3(Y_{0.5}La_{0.40}Gd_{0.10})_{0.95}Tb_{0.05}(PO_4)_3$ are obtained.

Figure 1:
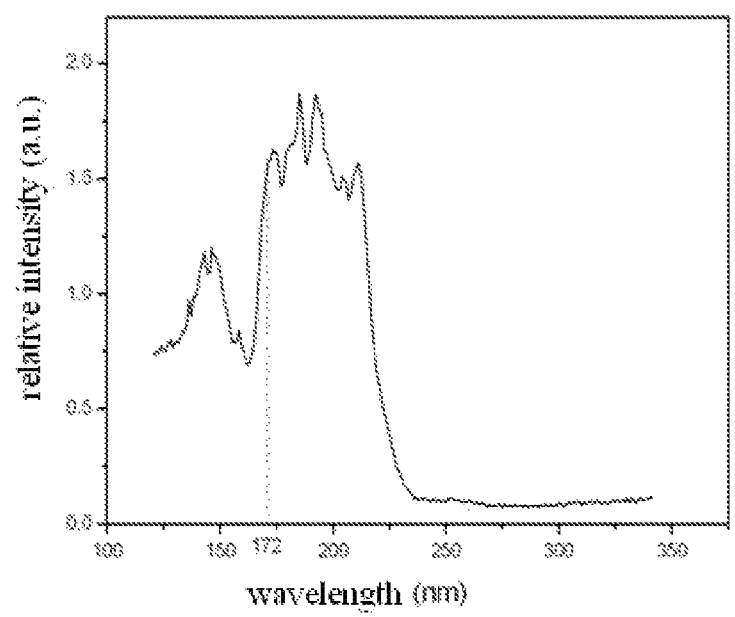
FIG. 1 shows an excitation spectrum of the $Ca_3La_{0.95}Tb_{0.05}(PO_4)_3$ of example 1, the excitation spectrum is tested with a monitoring wavelength of about 543 nm.

FIG. 1 shows an excitation spectrum of the $Ca_3La_{0.95}Tb_{0.05}(PO_4)_3$ of example 1. The excitation spectrum is test with a monitoring wavelength of 543 nm. There are two wave crests in the excitation spectrum of the $Ca_3La_{0.95}Tb_{0.05}(PO_4)_3$. The two wave crests locate at a wave length between about 150 nm to about 250 nm, indicating that the $Ca_3La_{0.95}Tb_{0.05}(PO_4)_3$ has a strong absorption of the vacuum ultraviolet light which has a wave length from about 150 nm to about 250 nm. The $Ca_3La_{0.95}Tb_{0.05}(PO_4)_3$ can be excited by the 172 nm light produced by Xe, and can be used in PDP or mercury-free fluorescent lamps.

Figure 2:
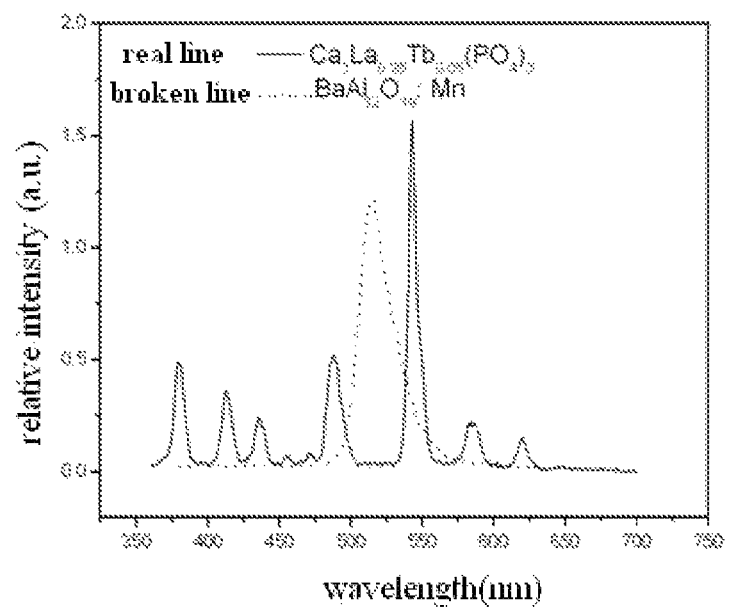
FIG. 2 shows emission spectrums of the $Ca_3La_{0.95}Tb_{0.05}(PO_4)_3$ of example 1 and a commercial $BaAl_{12}O_{19}:Mn$, the emission spectrums are tested with an excitation wavelength of about 172 nm.

FIG. 2 shows an emission spectrum (referring to the solid line) of the $Ca_3La_{0.95}Tb_{0.05}(PO_4)_3$ of example 1 excited by the 172 nm light, and an emission spectrum (referring to the broken line) of a commercial $BaAl_{12}O_{19}$:Mn excited by the 172 nm light. The two emission spectrums indicate that the $Ca_3La_{0.95}Tb_{0.05}(PO_4)_3$ has a luminescence intensity much greater than that of the commercial $BaAl_{12}O_{19}$:Mn.

Figure 3:
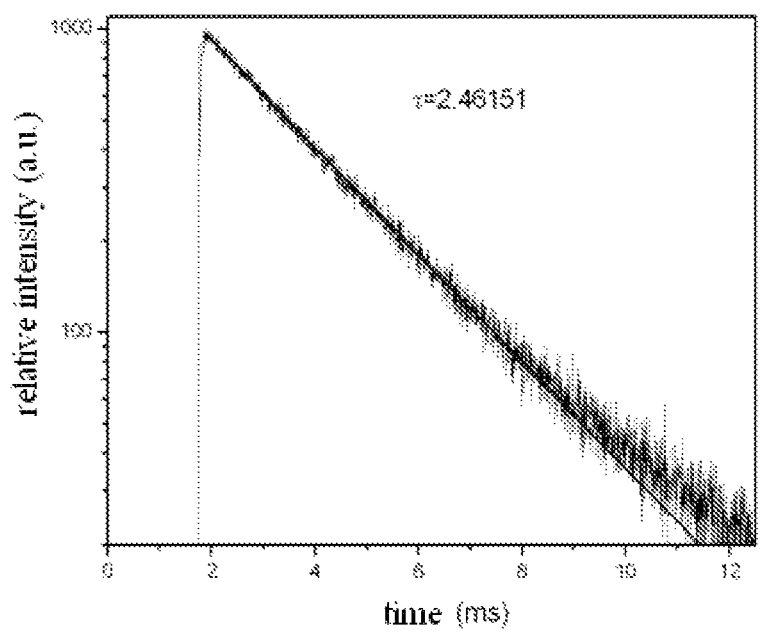
FIG. 3 shows a fluorescence life time test of the $Ca_3La_{0.95}Tb_{0.05}(PO_4)_3$ of example 1, the fluorescence life time is tested with an excitation wavelength of about 378 nm and a monitoring wavelength of about 543 nm.

FIG. 3 shows a fluorescence life time test of the $Ca_3La_{0.95}Tb_{0.05}(PO_4)_3$ of example 1. The fluorescence life time is tested with an excitation wavelength of about 378 nm and a monitoring wavelength of about 543 nm. According to a formula of "$I=I_0\exp(-t/\tau)$", in which $I_0$ is an initial luminescence intensity, and I is a luminescence intensity related to the afterglow time ($\tau$), a afterglow time of the $Ca_3La_{0.95}Tb_{0.05}(PO_4)_3$ is about 2.46 ms (the required afterglow time of the luminescent material is about 1 ms-5 ms).

The terbium doped phosphate-based green luminescent material of the exemplary embodiment has a strong absorption of the 172 nm light and has a short fluorescence life time. The $Ca_3La_{0.95}Tb_{0.05}(PO_4)_3$ has a afterglow time of about 2.46 ms, which is lower than that of the commercial $BaAl_{12}O_{19}$:

Mn. Additionally, the terbium doped phosphate-based green luminescent material in the embodiment has a higher luminescence intensity than that of the commercial $BaAl_{12}O_{19}$:Mn.

The preparation method of the terbium doped phosphate-based green luminescent material is simply, environmental friendly, easy controlled, and can be commercially processed.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. The terbium doped phosphate-based green luminescent material, which has chemical formula of $M_3RE_{1-x}Tb(PO_4)_3$ wherein, M is alkaline earth metal, RE is rare-earth element, and x is in a range of 0.001 to 1, wherein said rare-earth element RE is La, wherein said alkaline earth metal M is Ca.

2. The preparation method of terbium doped phosphate-based green luminescent material comprising:
    step one, providing the compound used as the source of alkaline earth metal, the compound used as the source of phosphate, the compound used as the source of rare-earth, and the compound used as the source of $Tb^{3+}$ according to the molar ratio of the elements in $M_3RE_{1-x}Tb_x(PO_4)_3$, wherein, the compound used as the source of phosphate is added at excess molar ratio in a range of 10%-30%, M is alkaline earth metal, RE is rare-earth element, and x is in a range of 0.001 to 1;
    step two, mixing and grinding the compounds to get a mixture;
    step three, sintering the mixture as pre-treatment, and then cooling the mixture to get a sintered matter; and
    step four, grinding the sintered matter, calcining the ground matter in a reducing atmosphere, and then cooling them to get the terbium doped phosphate-based green luminescent material;
    wherein the calcining step of step four is a two step process wherein, the ground matter is firstly calcined at the temperature in a range of 800° C. to 1500° C. for 4 hours to 24 hours, and then cooled and ground, after that, a second calcining process is carried out at the temperature in a range of 700° C. to 950° C. for 5 hours to 10 hours, at least one of the first calcining process and the second calcining process is carried out in a reducing atmosphere.

3. Preparation method of terbium doped phosphate-based green luminescent material according to claim 2, wherein the compound used as the source of alkaline earth metal is at least one of alkaline earth oxide, alkaline earth hydroxide, alkaline earth carbonate, and alkaline earth oxalate, the compound used as the source of phosphate is at least one of diammonium phosphate and ammonium dihydrogen phosphate, the compound used as the source of $RE^{3+}$ is rare-earth oxide, rare-earth nitrate, or rare-earth oxalate.

4. Preparation method of terbium doped phosphate-based green luminescent material according to claim 2, wherein sintering as pre-treatment is carried out at the temperature in a range of 300° C. to 700° C. for 1 hour to 6 hours.

5. Preparation method of terbium doped phosphate-based green luminescent material according to claim 2, wherein the reducing atmosphere is the mixing gases of nitrogen and hydrogen, hydrogen, or carbon monoxide.

6. Preparation method of terbium doped phosphate-based green luminescent material according to claim 2, wherein said rare-earth element RE is at least one of Gd, Y, and La.

7. Preparation method of terbium doped phosphate-based green luminescent material according to claim 2, wherein said alkaline earth metal M is at least one of Ca, Sr, and Ba.

* * * * *